(12) United States Patent
Wylie et al.

(10) Patent No.: US 11,314,696 B2
(45) Date of Patent: Apr. 26, 2022

(54) SYSTEM AND METHOD FOR MANAGING COLLABORATIVE MULTIUSER DOCUMENT EDITING VIA A DISTRIBUTED LEDGER

(71) Applicant: Capital One Services, LLC, McLean, VA (US)

(72) Inventors: Stephen Wylie, Carrollton, TX (US); Qiaochu Tang, The Colony, TX (US); Micah Price, Plano, TX (US); Geoffrey Dagley, McKinney, TX (US); Jason Hoover, Grapevine, TX (US); Habeeb Hooshmand, McKinney, TX (US)

(73) Assignee: Capital One Services, LLC, McLean, VA (US)

(*) Notice: Subject to any disclaimer, the term of this patent is extended or adjusted under 35 U.S.C. 154(b) by 197 days.

(21) Appl. No.: 16/849,369

(22) Filed: Apr. 15, 2020

(65) Prior Publication Data
US 2021/0326308 A1    Oct. 21, 2021

(51) Int. Cl.
| | | |
|---|---|---|
| *G06F 16/176* | (2019.01) | |
| *G06F 16/182* | (2019.01) | |
| *G06Q 40/02* | (2012.01) | |
| *H04L 9/06* | (2006.01) | |
| *G06F 21/60* | (2013.01) | |

(52) U.S. Cl.
CPC ...... *G06F 16/1774* (2019.01); *G06F 16/1837* (2019.01); *G06F 21/602* (2013.01); *G06Q 40/025* (2013.01); *H04L 9/0637* (2013.01)

(58) Field of Classification Search
CPC ............ G06F 16/1774; G06F 16/1837; G06F 21/6227; G06F 21/602; H04L 9/0637; G06Q 40/025
USPC ........................................................ 707/827
See application file for complete search history.

(56) References Cited

U.S. PATENT DOCUMENTS

| | | | |
|---|---|---|---|
| 10,108,812 B2 | 10/2018 | Ansari et al. | |
| 10,356,094 B2 * | 7/2019 | Anton | ................. G06F 16/2255 |
| 2013/0124638 A1 * | 5/2013 | Barreto | ............. G06F 16/24565 |
| | | | 709/205 |
| 2014/0026182 A1 * | 1/2014 | Pearl | ..................... G06F 21/554 |
| | | | 726/1 |

(Continued)

*Primary Examiner* — Shahid A Alam
(74) *Attorney, Agent, or Firm* — Kacvinsky Daisak Bluni PLLC

(57) ABSTRACT

An electronic device may include logic to provide a trust credential for linking to a permissioned network over a local network, comprising a plurality of user devices; retrieve a document in an initial status for editing, corresponding to a first state of a distributed ledger, maintained by the permissioned network; generate a first change in the document, wherein the document is in a second status; send, to the permissioned network via the local network, the first change for storage in the distributed ledger, in a second state; retrieve the document in a third status, including a second change, performed subsequently to the first change, the second change being generated by a user device, external to the electronic device, and coupled to the local network; and link to the distributed ledger to retrieve a third state of the distributed ledger, the third state comprising the first change and the second change.

20 Claims, 7 Drawing Sheets

(56) References Cited

U.S. PATENT DOCUMENTS

| | | | |
|---|---|---|---|
| 2016/0070449 A1* | 3/2016 | Christiansen | G06F 16/9535 715/765 |
| 2017/0220815 A1* | 8/2017 | Ansari | G06Q 20/389 |
| 2017/0221288 A1* | 8/2017 | Johnson | G07C 9/257 |
| 2019/0327080 A1* | 10/2019 | Liu | G06F 21/6218 |
| 2019/0333059 A1* | 10/2019 | Fallah | G06F 16/1834 |
| 2019/0385229 A1* | 12/2019 | Leonard | H04L 9/0637 |

\* cited by examiner

SYSTEM AND METHOD FOR MANAGING COLLABORATIVE MULTIUSER DOCUMENT EDITING VIA A DISTRIBUTED LEDGER

TECHNICAL FIELD

Embodiments described herein generally relate to a collaborative, shared, document editing.

BACKGROUND

Known collaborative document editing systems include systems deployed using cloud-based document editing services. These systems are limited in terms of privacy and ability to track and manage edits. In addition, for editing financial documents, such as financial contracts, applications, and the like, such known collaborative document editing systems may be overly cumbersome, while susceptible to errors, where the document changes may not be auditable in a satisfactory manner.

With respect to these and other considerations the present disclosure is provided.

SUMMARY OF THE DISCLOSURE

This disclosure presents various systems, components, and methods related to using a blockchain for collaborative document editing. Each of the systems, components, and methods disclosed herein provides one or more advantages over conventional systems, components, and methods.

In one embodiment, an electronic device may include a storage device, and logic, at least a portion of the logic implemented in circuitry coupled to the storage device. The logic may provide a trust credential for linking to a permissioned network over a local network, the local network comprising a plurality of user devices; retrieve a document at a first instance for editing, the document being in an initial status, corresponding to a first state of a distributed ledger, maintained by the permissioned network; generate a first change in the document, wherein the document is in a second status after the first change; send, to the permissioned network via the local network, the first change for storage in the distributed ledger, in a second state; retrieve the document at a second instance when the document is in a third status, the third status including a second change, performed subsequently to the first change, the second change being generated by a user device, external to the electronic device, and coupled to the local network; and link to the distributed ledger to retrieve a third state of the distributed ledger, the third state comprising the first change and the second change.

In another embodiment, a method may include providing a trust credential for linking an electronic device to a permissioned network; retrieving a document at a first instance, in an initial status, the initial status being represented in a first state of a distributed ledger maintained by the permissioned network; and generating a first change in the document, wherein the document is in a second status after the first change. The method may also include sending the first change to the permissioned network via a local network, for storage in the distributed ledger as a second state, derived from the first state; retrieving the document in a third status at a second instance, the third status including a second change, performed subsequently to the first change, the second change being generated by a user device, external to the electronic device, and coupled to the local network; and retrieving the distributed ledger from the permissioned network via the local network, the distributed ledger being in a third state comprising the first change and the second change.

In a further embodiment at least one non-transitory computer-readable medium is provided, comprising a set of instructions that, in response to being executed on a computing device, cause the computing device to: provide a trust credential for linking an electronic device via a local network to a permissioned network; retrieve a document in an initial status; the initial status being represented in a first block of a blockchain maintained by the permissioned network; and generate a first change in the document, wherein the document is in a second status after the first change. The set of instructions cause the computing device to send the first change for storage, via the local network to the permissioned network, in a second block of the blockchain, derived from the first block; retrieve, the document, the document being in a third status, the third status including a second change, performed subsequently to the first change, the second change being generated by a user device coupled to the local network, external to the electronic device; and retrieve from the permissioned network via the local network a third block of the blockchain, the third block comprising the first change and the second change.

DETAILED DESCRIPTION

Various embodiments provide novel approaches for collaborative document editing. In this context, a "collaborative document" may refer to any document or form, including standardized or custom forms, where the document or form is available for editing by multiple users. In some embodiments, a distributed ledger technology such as blockchain may be employed for facilitating collaborative editing among a set of devices, where trust may be established between devices that are connected via wired or wireless technology. As such, when operating in a collaborative mode where multiple users may interact over multiple devices, a given user or document editor may be better informed of simultaneous changes that other users are making, providing a more unified editing experience.

Figure 1:
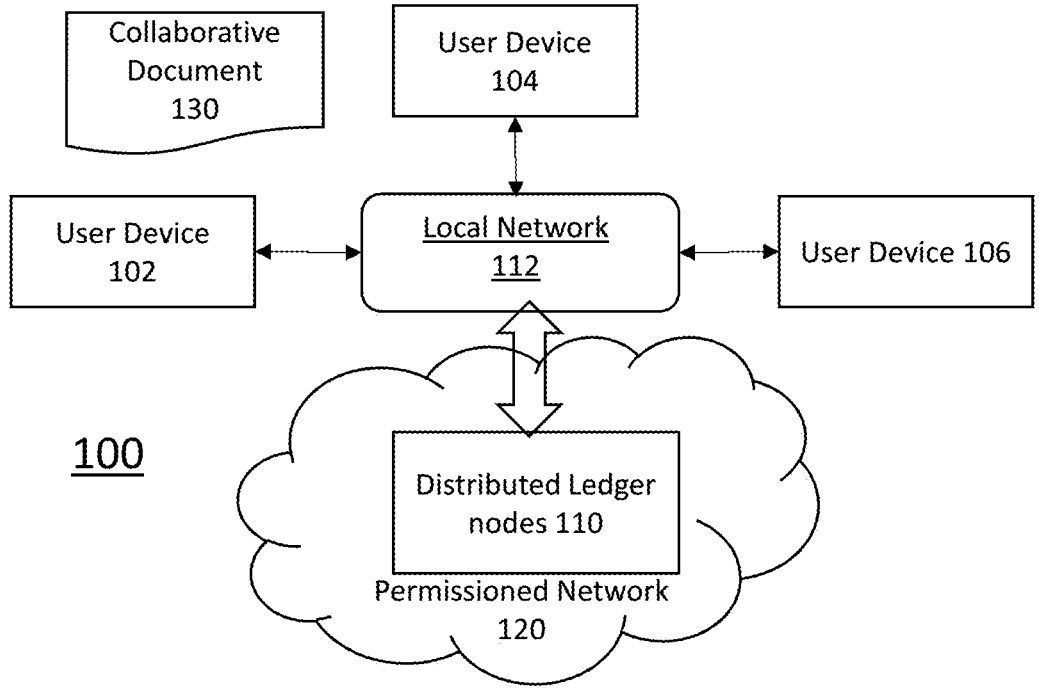
FIG. 1 illustrates a collaborative environment.

FIG. 1 illustrates a collaborative editing environment 100 such as may be representative of various embodiments in which techniques for providing document editing may be implemented. The collaborative editing environment 100 may include a local network 112, where a multiplicity of user devices may couple to the local network. In some examples the local network 112 may be a local wired network or local wireless network, where communications over the local network 112 may take place generally as known in the art, except as otherwise noted herein. Overall, communications over the local network 112 can operate according to any known networking protocol or standard for a wireless network or wired network.

In the example shown, a user device 102, user device 104 and user device 106 are coupled to communicate over the local network 112. The user device 102, user device 104 and user device 106 may represent users that are coupled to access a permissioned network 120, including a multiplicity of distributed ledger nodes, detailed below. In various embodiments, the permissioned network 120 may represent a distributed ledger network run by a third party central authority or may be a distributed ledger network operated by multiple nodes linked together directly, for example, having direct access to one another over a wired or wireless network.

Overall, communications over the permissioned network 120 may be encrypted and therefore secure represents a secure network. In particular embodiments the permissioned network 120 may represent a blockchain network, where the blockchain network may store edits to a collaborative document that is edited by one or more users through the user device 102, user device 104, and user device 106. In particular embodiments, the permissioned network 120 may be based on Hyperledger® Fabric (Hyperledger is a registered trademark of the Linux Foundation). As such, the permissioned network 120 may represent a private, permissioned network, or a private channel of network.

Figure 2:
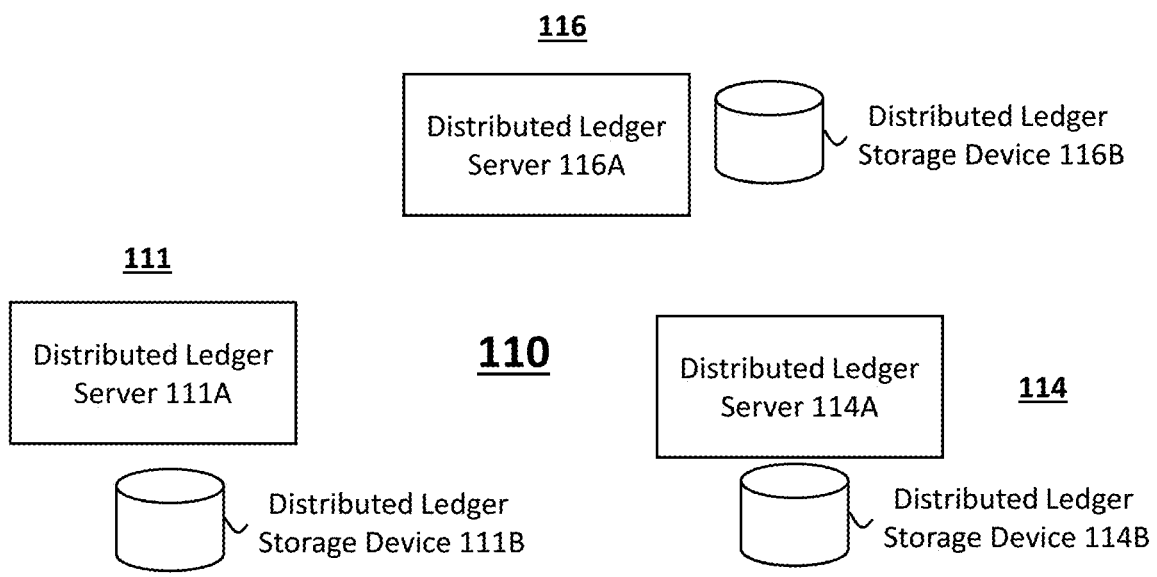
FIG. 2 depicts a general topology for distributed ledger nodes.

FIG. 2 depicts a general topology for one example of distributed ledger nodes 110, showing three different nodes, merely for the purposes of illustration. A given node may be maintained in a device, such as a computing device, such as a mainframe computer, a personal computer, laptop computer, notebook computer, and so forth. The embodiments are not limited in this context. In FIG. 2, a distributed ledger node 111 is represented by a distributed ledger server 111A and distributed ledger server storage device 111B. Likewise, a distributed ledger node 114 is represented by a distributed ledger server 114A and distributed ledger storage device 114B, while a distributed ledger node 116 is represented by a distributed ledger server 116A and distributed ledger storage device 116B. Notably, in the configuration of FIG. 2, a distributed ledger server and distributed ledger storage device may be embodied in the same device.

In accordance with some embodiments of the disclosure, the different user devices may establish trust with one another in order to participate in collaborative editing of a document, as represented by collaborative document 130. In one implementation, the user device 106, user device 104, and user device 102 may be operated by users of a common organization, such a governmental organization, an educational organization, a business or other commercial entity. The embodiments are not limited in this context. In particular embodiments, the collaborative document 130 may represent any suitable document that may require or may receive inputs from multiple users. Said differently, the collaborative document 130 may represent a type of document that generally is changed, updated, formatted by more than one party.

In some embodiments, the user device 102, user device 104, and user device 106 may establish trust with one another by sharing cryptographic information, such as sharing a private cryptographic key.

In other embodiments of the disclosure, trust may be established based upon identity of the user devices, stored in a distributed ledger, such as a blockchain. In particular embodiments, a whitelist may be maintained of media access control (MAC) addresses of various permissioned devices. A MAC address of a device is a unique identifier assigned to a network interface controller (NIC). For example, the user device 102 may have multiple network adapters, such as an Ethernet adapter and a wireless network adapter, each with a different MAC address. These different MAC addresses may be maintained on a whitelist maintained on a blockchain in question according to some embodiments. Similarly, MAC addresses for user device 104 and user device 106 may be maintained on the whitelist. More generally, the MAC addresses of any Ethernet-connected, Bluetooth-connected, or WiFi-connected device, to be given permission for collaborative editing for the collaborative document 130, may be maintained on the whitelist. Alternatively, or in addition to the maintaining of whitelist of MAC addresses, a whitelist of permissioned devices may include the TCP/IP address of the permissioned devices.

In accordance with embodiments of the disclosure, when modifications of a collaborative document or form are to be stored in a distributed ledger or blockchain in particular, the initial state may be stored in the blockchain. As in known configurations of a distributed ledger or blockchain, the distributed ledger will serves as a decentralized database that maintains details about each change. In the present embodiments, changes to a document or form may be added to the distributed ledger and propagated simultaneously across all the distributed ledger nodes 110, with each node maintaining complete embodiments of a blockchain the changes or edits may be maintained in the ledger in chronological order and stored as a series of blocks.

During editing of a document, information that is propagated to the distributed ledger or blockchain for storage in new block will represent any actions or operations performed on the document by any user of any of the user devices coupled to the local network, such as local network 112. Non-limiting examples of such operations include editing areas of text of the document, including coordinates of those text areas, placing objects in the document, such as images or non-text objects, and so forth.

In accordance with some embodiments of the disclosure, a given change made to a collaborative document may be stored in a block of a blockchain as a "delta" or difference between the collaborative document in a first state and the collaborative document in a second state, immediately after the given change is entered.

In accordance with other embodiments of the disclosure, a given change made to a collaborative document may be stored in a block of a blockchain as the entire collaborative document, in the second state, immediately after the given change is made.

Figure 3A:
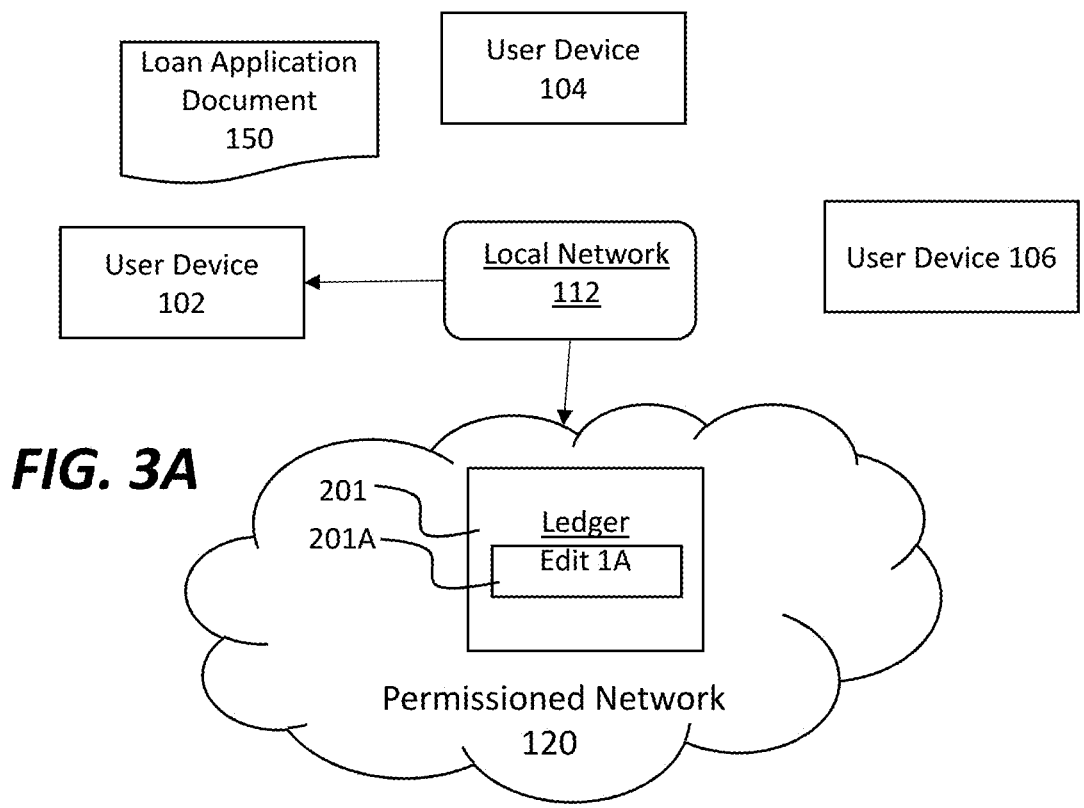
FIG. 3A-3C shows one use scenario for collaborative editing, in accordance with embodiments of the disclosure.
Figure 3B:
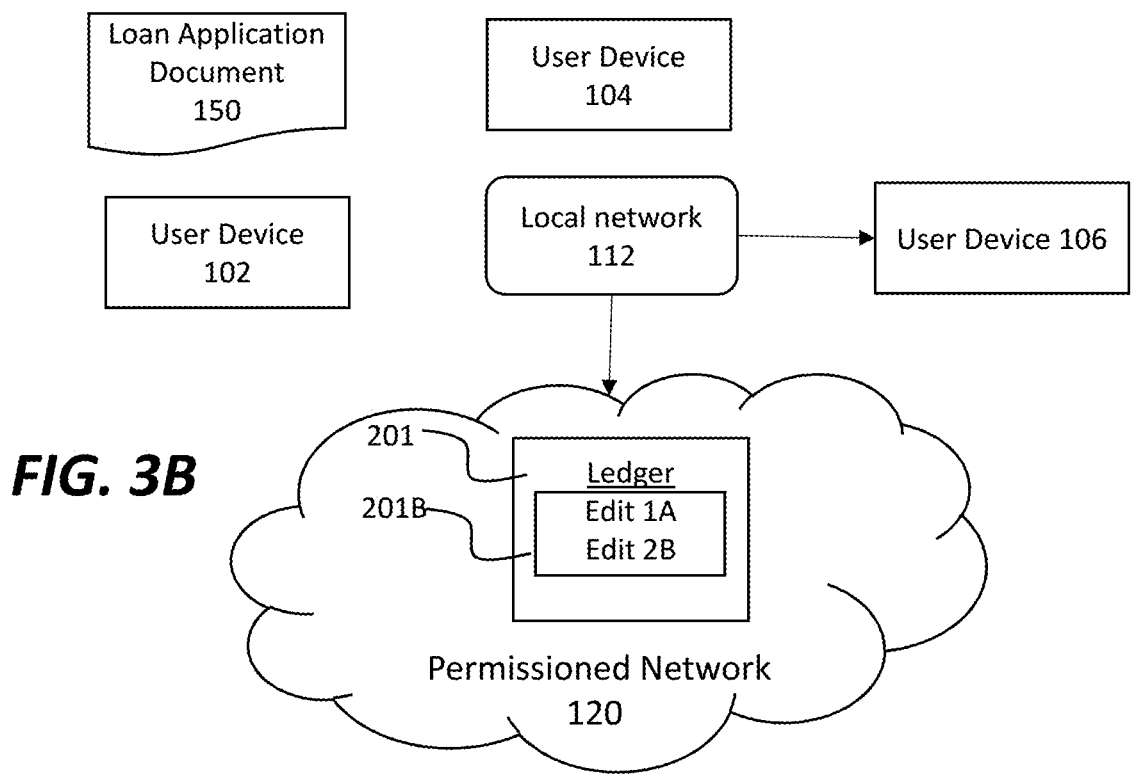
Figure 3C:
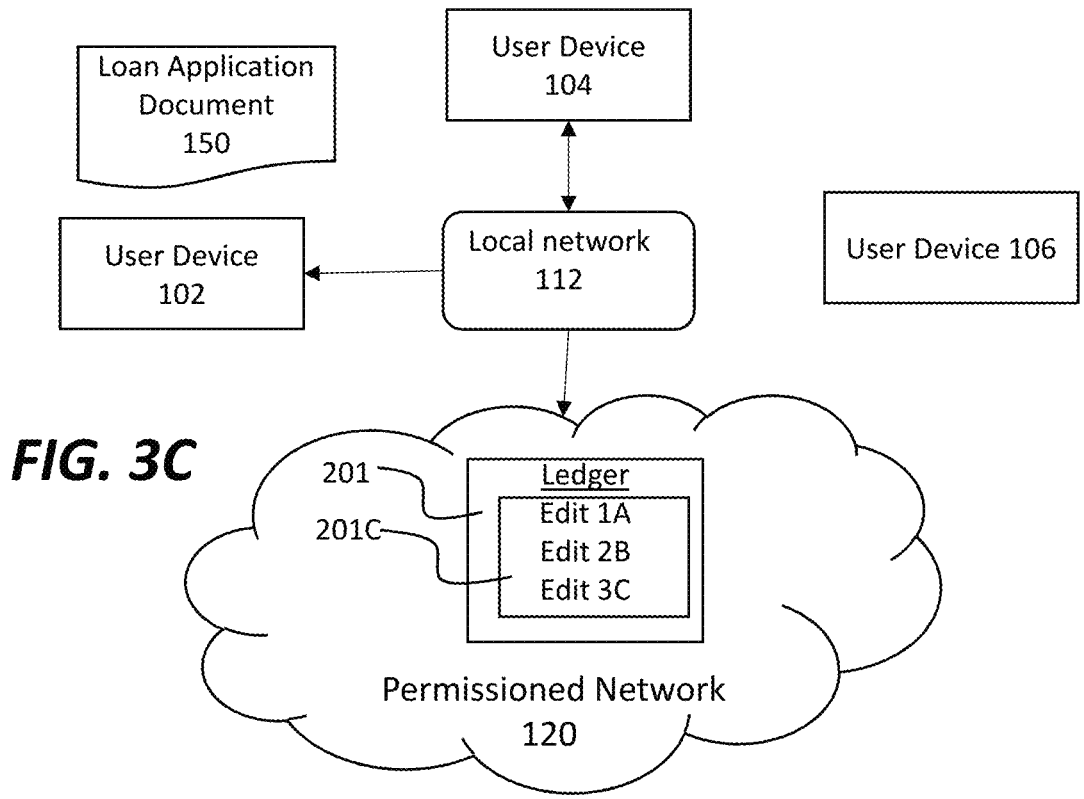

FIG. 3A-3C shows one use scenario for collaborative editing, in accordance with embodiments of the disclosure. In the example of FIG. 3A, a group of users may form a team within a commercial organization, such as a lending institution, to process a loan application document 150, which document may represent a real estate loan document or an auto loan document in different non-limiting embodiments. The loan application document 150 may be made available for retrieval by authorized users in any suitable form. In the context of blockchain editing, such as using Hyperledger Fabric, various users may be granted access to a channel for creating a dedicated distributed ledger for storing and tracking edits to a given collaborative document.

When user device 102 retrieves the loan application document 150 for editing, the user of user device 102 may find the loan application document 150 in an initial state. After performing an operation or group of operations on the loan application document 150, the changes to the loan application document 150 performed by the user of user device 102 may be saved as edit 1A to a ledger 201. Notably, the ledger 201 may be simultaneously propagated to multiple nodes of a blockchain system or similar distributed ledger system. For example, a whitelisted MAC address or whitelisted IP address may provide the appropriate trust credential for editing and storing changes to the loan application document 150 to a ledger that is operated by the permissioned network 120.

In embodiments where the permissioned network 120 represents a distributed ledger network operated by multiple nodes linked together directly over a wired or wireless network, the changes to the loan application document 150 may thus be communicated directly to all the nodes of the permissioned network 120.

For purposes of illustration, in one example, a ledger block 201A of the ledger 201 is shown to contain the edit 1A, where the edit 1A may constitute a proposed change to a loan term for the loan application document 150. As noted previously, document changes may be stored as "deltas" between, in this case, the loan application document 150, before the editing by user device 102 and after the editing by user device 102, or alternatively as a new version of the document, in this case, loan application document 150.

As such, other user devices having the proper trust credentials may be coupled to edit the loan application document 150 in a similar manner to the scenario of FIG. 3A. For example, user device 106 retrieves the loan application document 150 for editing, the user of user device 106 may find the loan application document 150 in an initial state, or alternatively in an edited state. As shown in FIG. 3B, after performing an operation or group of operations on the loan application document 150, the changes to the loan application document 150 performed by the user of user device 106 may be saved as edit 2B to a ledger 201. Notably, the ledger 201 in the form shown in FIG. 3B may be simultaneously propagated to multiple nodes of a blockchain system or similar distributed ledger system. In one example, where the edit 2B is entered after the edit 1A, the ledger 201 may store the edits in a ledger block 201B generally as shown in FIG. 3B.

In embodiments employing a Hyperledger Fabric-based blockchain, the data for a collaborative document may be stored both as a blockchain ledger and a so-called world state, where the world state represents a current value of the document in question. Notably, the illustration of FIG. 3A and FIG. 3B present just general features of a ledger, where the different ledger blocks of the ledger 201 may represent the blockchain portion of data that is stored with respect to the edits to the loan application document 150. Different than the world state, in embodiments where the ledger 201 represents a blockchain ledger, the ledger blocks 201A and 201B are immutable and cannot be changed. Said differently, the ledger 201 may represent a blockchain, where the blockchain builds a continually increasing series of blocks.

As known in the art, because the individual blocks of the blockchain are immutable, the different blocks of the blockchain (such as ledger 201) will effectively present a record that stores the chronological order of edits performed on the loan application document 150 in an unmutable fashion. In the example of FIG. 1B, the ledger block 201B lists the edit 1A and edit 2B, where the position of the edits may represent the order received for purposes of illustration. Thus, the ledger block 201B shows that the edit 1A to loan application document 150 was recorded firstly, while the edit 2B was recorded subsequently.

In one use scenario according to embodiments of the disclosure, when a first user of user device 102 attempts to undo or revise a change made to the loan application document 150, made by a second user, such as the user of user device 106, the loan application document may be changed to the state that reflects the revision by the user of the user device 102. For example, starting from an initial state, the loan application document may undergo a series of edits, performed by different user devices, where the loan application appears the same as the initial state after the series of edits. However, each of the series of edits may be propagated as a new ledger entry in a new block of a blockchain. Thus, a series of three edits made to the loan application document 150 may be stored as three successive blocks in a blockchain, where the last block presents an immutable chronological record of the three edits, regardless of the present state of the loan application document 150.

Turning to the scenario of FIG. 3C, there is shown a further instance after the instance of FIG. 3A, where the user of user device 102 retrieves the loan application document 150 for further editing. In this example, the assumption is that the loan application document has undergone one or more changes subsequent to an initial state. As shown in FIG. 3C, after performing an operation or group of operations on the loan application document 150, the changes to the loan application document 150 performed by the user of user device 102 may be saved as edit 3C to the ledger 201. Notably, the ledger 201 in the form shown in FIG. 3C may be simultaneously propagated to multiple nodes of a blockchain system or similar distributed ledger system. In one example, where the edit 3C is entered after the edit 2B, so that the ledger 201 may store the edits in a ledger block 201C generally as shown in FIG. 3C.

Figure 4:
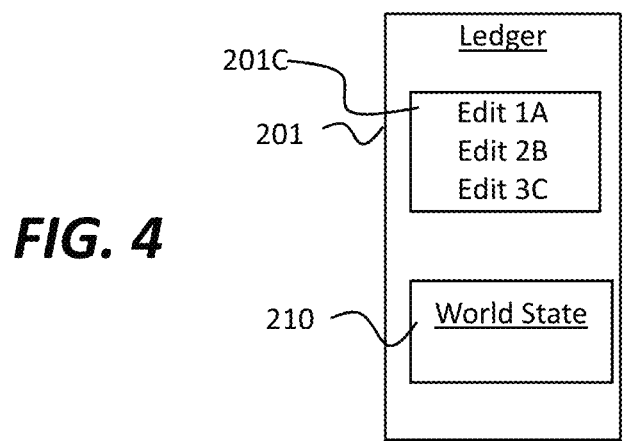
FIG. 4 shows an example of a distributed ledger at the instance of FIG. 3C.

In a particular embodiment, the edit 2B may represent a proposed change to the loan application document 150, entered by the user of user device 106. In response, the edit 3C may constitute a rejection (or, alternatively, an acceptance) of the proposed change entered by the user of user device 106. As such, at the instance of FIG. 3C, the world state for the loan application document 150, stored, for example, in the ledger 201, may be similar to the world state for loan application document 150 at the instance of FIG. 3A. Notably, as shown in FIG. 4, at the instance of FIG. 3C, the ledger 201 may include the world state 210 as well as the ledger block 201C, which block will reflect that the proposed change, edit 3B, was subsequently rejected, as shown in edit 3C.

In a collaborative mode where multiple users may interact with the same document over the same time span, the ledger 201 preserves the chronological record of the updating of the loan application document 150 so that details of the loan application process may be better and more accurately understood in a timely fashion. As noted, the collaborative editing procedures of the present embodiments, such as illustrated in FIGS. 3A-3C do not require connections to a single third party, where trusted user devices may communicate updates to the loan application document 150 for blockchain storage via mechanisms such as Bluetooth or TCP/IP.

Moreover, to aid in collaborative document editing, notifications or changes in a document may be shared among various user devices, coupled to a local network, via various communications means, such as email, short message service, and so forth.

Figure 5A:
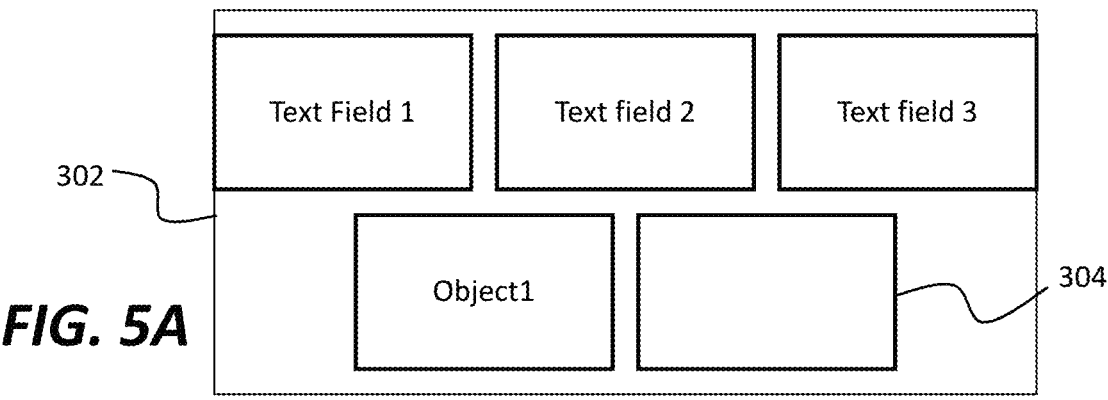
FIGS. 5A-5D illustrate a document at different stages of collaborative editing.

FIGS. 5A-5D and FIG. 6 illustrate a further example of collaborative document editing according to some embodiments of the disclosure. In FIG. 5A, a document 302 is shown in schematic form in an initial state, having a text field 1, text field 2, text field 3, and object1. Notably, the document 302 may be a form where various text may be populated in any or all of the text fields shown. The object1 may populate an object field (not separately shown) that is located in the same area of the document 302 as shown for the object 1. In addition, the document 302 may include an object field 304, currently unpopulated at the instance of FIG. 5A.

Figure 5B:
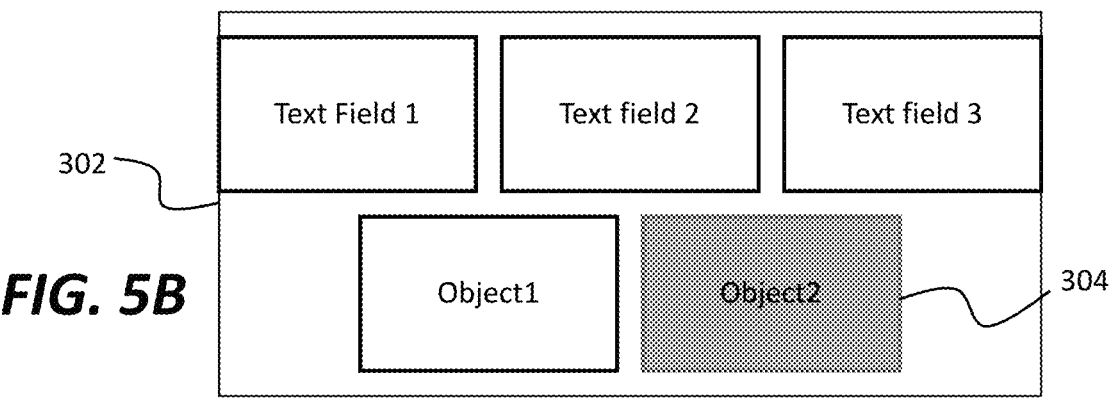

At FIG. 5B, there is shown a subsequent instance after a user device has generated edits to the document of FIG. 5A. At this stage, an object2 is added to the object field 304, such as an image.

Figure 5C:
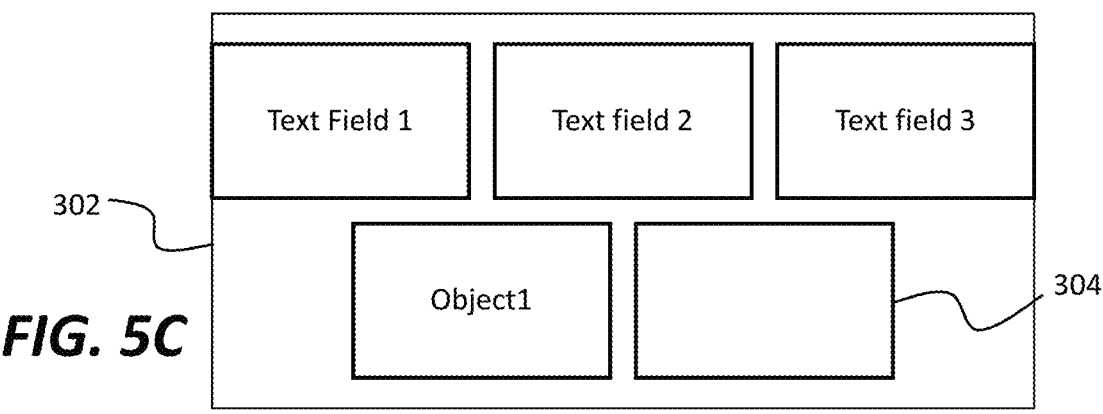

At FIG. 5C, there is shown a subsequent instance after a user device has generated edits to the document of FIG. 5B. At this stage, the object2 has been removed from the object field 304. For example, the object2 may have been initially added by a first user device at FIG. 5B to the document 302, while the object2 is removed at FIG. 2C by a second user device.

Figure 5D:
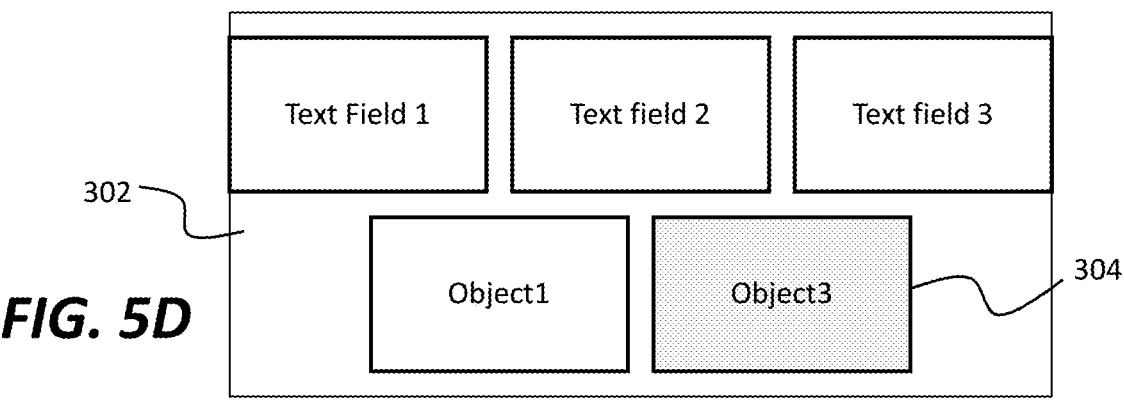

At FIG. 5D, there is shown a subsequent instance after a user device has generated edits to the document of FIG. 5C. At this stage, an object 3 has been added to the object field 304, such as an different image than the object2. Thus, the document 302 has undergone a series of edits after an initial state of FIG. 5A, resulting in the addition of an object3 in the object field 304.

In accordance with embodiments of the disclosure, the multidevice edits of FIGS. 5A-5D may be performed in the context of a local network, such as local network 112.

Figure 6:
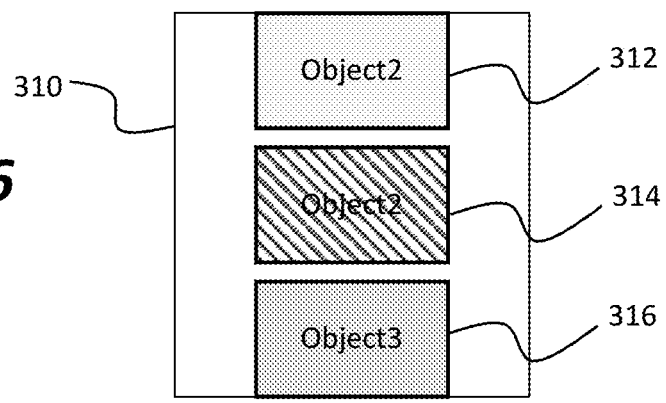
FIG. 6 illustrates an exemplary block of a blockchain at the instance of FIG. 5D.

FIG. 6 depicts an exemplary block, shown as block 310, where the block 310 may represent a block of a blockchain for storing edits related to the document 302. The block 310 may represent a block that is generated after the instance shown in FIG. 5D. Notably, the block 310 is presented in schematic form. Thus, the ledger entry 312 represents the edit adding the object2 to the document 302, while the ledger entry 314 represents the edit removing the object2 from the document 302. The ledger entry 316 represents the edit adding the object3 to the same field, object field 304, from which the object2 was added and subsequently removed. The block 310, being immutable, captures and preserves the order of edits that occurred to generate the document 302 is the present form of FIG. 5D.

Thus, when a user or other third party subsequently retrieves the document 302 in the state shown in FIG. 5D, the block 310 may be used to apprise the user of the various edits performed on the document 302, as well as the order of edits, resulting in the present state of the document 302.

Notably, according to various embodiments of the disclosure, a distributed ledger, such as a blockchain, may provide the provenance of the edits made to a collaborative document. In particular, the ledger entries may provide data identifying the user device generating a given edit. Thus, users connected to a local network may readily be apprised in timely fashion of an entire edit history of a document being processed in a collaborative manner, including order of changes, party making a given change, and so forth.

Figure 7:
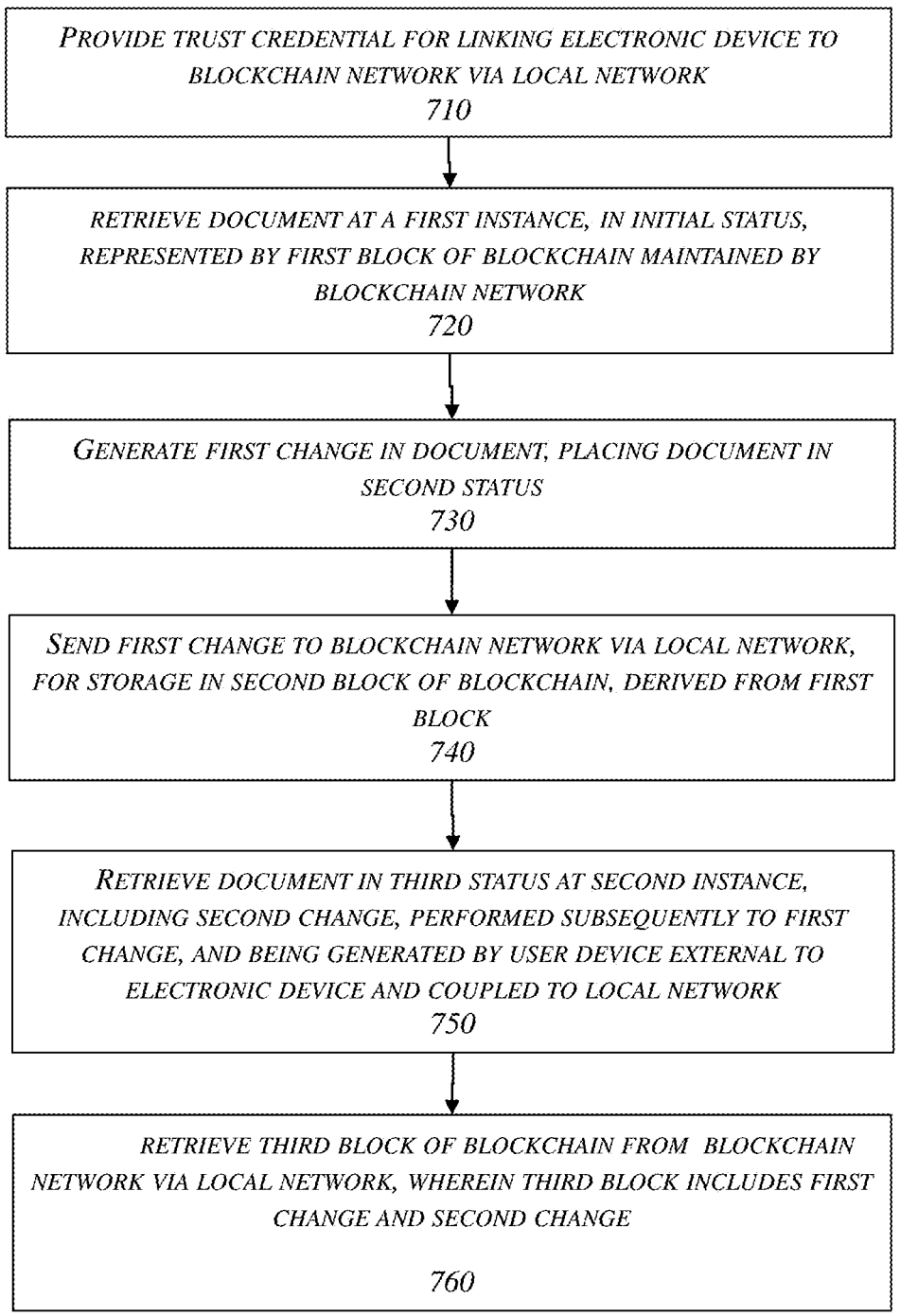
FIG. 7 illustrates a first logic flow.

FIG. 7 illustrates an example of a logic flow 700 that may be representative of techniques for collaborative document editing, consistent with embodiments of the disclosure.

At block 710, a trust credential is provided for linking an electronic device to a blockchain network over a local network. In various implementations, the blockchain network may represent a network, run by a third party central authority or may be a distributed ledger network operated by multiple nodes linked together directly over a wired or wireless network.

In some embodiments, multiple devices may be provided a trust credential for linking to the blockchain network, where trust may be established based upon identity of the user devices, stored in in the blockchain. In particular embodiments, a whitelist may be maintained MAC addresses or TCP/IP address of the perrnissioned devices.

In some examples the local network may be a local wired network or local wireless network, where communications can operate according to any known networking protocol or standard for a wireless network or wired network.

At bock 720, a document is retrieved at a first instance, in an initial status, represented by first block of blockchain maintained by the blockchain network. For example, the document may be a form or other document to be edited, where the document requires updating and editing from the initial status by multiple parties that have access to the document. In various embodiments multiple electronic devices (user devices) including the electronic device may be coupled to communicate with one another over the local network.

At block 730, a first change is generated in the document, for example, by the electronic device, placing the document in a second status. For example a text field within an application form may be edited, or an object inserted into the document.

At block 740, when linked to the blockchain network, the first change of the now edited document is sent for storage, such as from the local network, in a second block of the blockchain, maintained by the blockchain network. As such, the second block will be derived from the first block.

Send first change to blockchain network via local network, for storage in second block of blockchain, derived from first block. As such, the first change may be stored in the second block as a "delta" or difference between the document in the first status and the document in the second status.

In accordance with other embodiments of the disclosure, the first change may be stored in the second block as the entire document, in the second status, immediately after the first change is made.

At block 750, the document is retrieved in a third status at a second instance, where the document now includes a second change, performed subsequently to the first change. The second change may be generated by a user device that is separate or external to the electronic device generating the first change. The user device generating the second change may also be coupled to the local network. In some embodiments, the document in the third status may be retrieved by the electronic device, or alternatively by a third device that is different than the electronic device generating the first change, as well as the user device generating the second change. The third device may also be coupled to the local network.

At block 760 the third block of the blockchain is retrieved from the blockchain network via the local network, wherein the third block includes the first change and the second change. In other words, the third block may be derived directly from the second block, thus including changes to the document from the first status to the third status, including an order of changes.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 8:
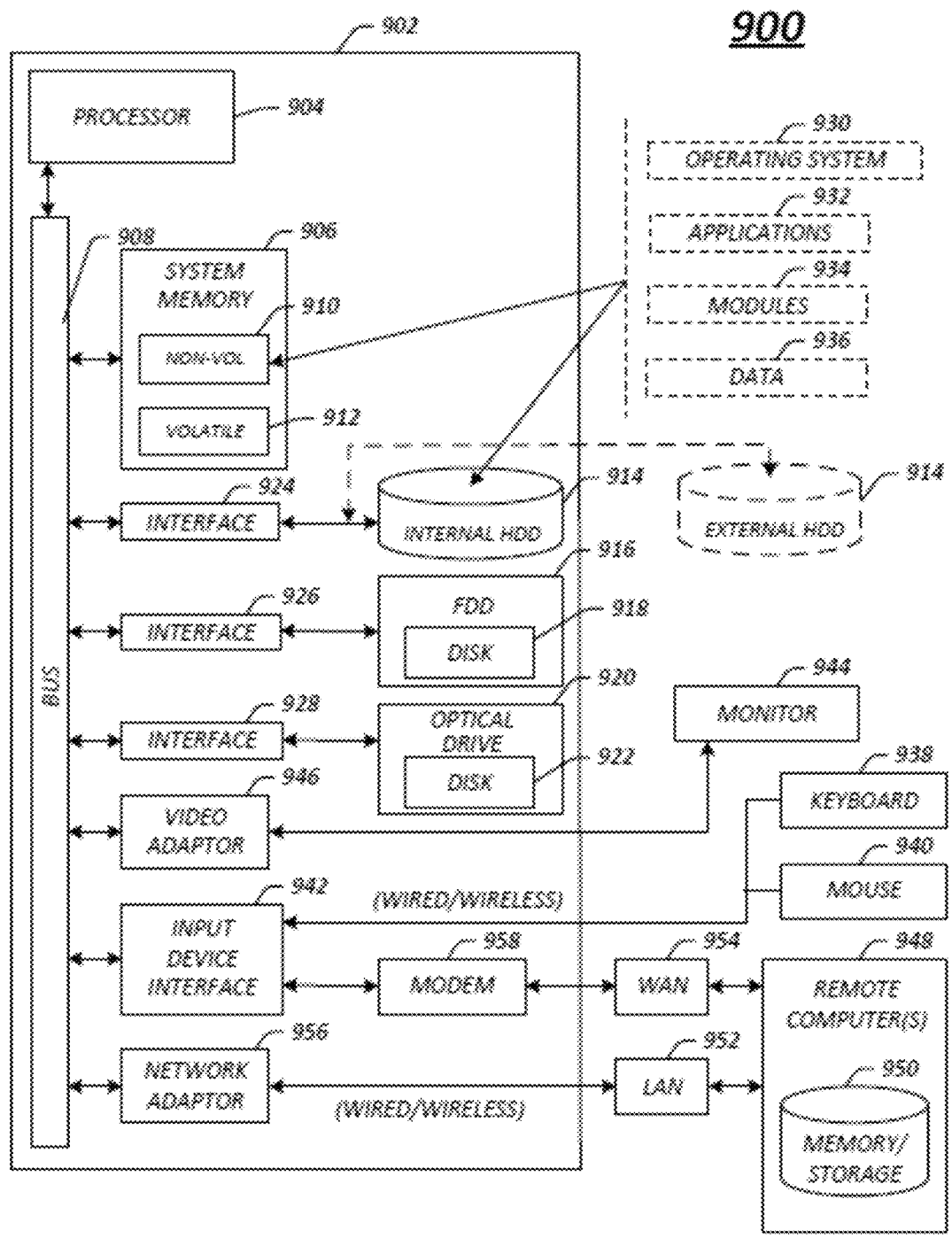
FIG. 8 illustrates a computing architecture.

FIG. 8 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the collaborative editing environment 100. More generally, the computing architecture 900 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 8, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units (910, 912), including an operating system 930, one or more application programs 932, other program modules 934, and program data 936. In one embodiment, the one or more application programs 932, other program modules 934, and program data 936 can include, for example, the various applications and/or components of the collaborative environment of FIG. 1.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, just a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined just by the preceding illustrative description.

The invention claimed is:

1. An electronic device, comprising:
a storage device; and
logic, at least a portion of the logic implemented in circuitry coupled to the storage device, the logic to:
provide a trust credential for linking to a permissioned network over a local network, the local network comprising a plurality of user devices;
retrieve a document at a first instance for editing, the document being in an initial status, corresponding to a first state of a distributed ledger, maintained by the permissioned network;
generate a first change in the document, wherein the document is in a second status after the first change;
send, to the permissioned network via the local network, the first change for storage in the distributed ledger, in a second state;
retrieve the document at a second instance when the document is in a third status, the third status including a second change, performed subsequently to the first change, the second change being generated by a user device, external to the electronic device, and coupled to the local network; and
link to the distributed ledger to retrieve a third state of the distributed ledger, the third state comprising the first change and the second change.

2. The electronic device of claim 1, the document comprising a real estate loan document or an auto loan document.

3. The electronic device of claim 1, the first change comprising a first edit to the document, and the second change comprising a rejection or acceptance of the first change.

4. The electronic device of claim 1, the distributed ledger comprising a blockchain, wherein the first state is contained in a first block of the blockchain, the logic to send the first change for storage in a second block of the blockchain as a difference between the first state and the second state.

5. The electronic device of claim 4, the logic to send the first change for storage in the second block of the blockchain, by storing an entirety of the document, including the first change.

6. The electronic device of claim 4, the logic to send the first change for storage in the second block of the blockchain by specifying a document coordinate containing the first change.

7. The electronic device of claim 1, wherein the third state of the distributed ledger comprises a plurality of changes to the document, with respect to the initial status, wherein the logic to present the plurality of changes in chronological order of change.

8. The electronic device of claim 1, the first change comprising an object image, inserted into the document.

9. The electronic device of claim 1, the trust credential comprising a cryptographic key, a whitelisted MAC address, or a whitelisted IP address.

10. A method, comprising:
providing a trust credential for linking an electronic device to a permissioned network;
retrieving a document at a first instance, in an initial status, the initial status being represented in a first state of a distributed ledger maintained by the permissioned network;
generating a first change in the document, wherein the document is in a second status after the first change;
sending the first change to the permissioned network via a local network, for storage in the distributed ledger as a second state, derived from the first state;
retrieving the document in a third status at a second instance, the third status including a second change, performed subsequently to the first change, the second change being generated by a user device, external to the electronic device, and coupled to the local network; and
retrieving the distributed ledger from the permissioned network via the local network, the distributed ledger being in a third state comprising the first change and the second change.

11. The method of claim 10, the distributed ledger comprising a blockchain, wherein the blockchain is maintained by a wireless or wired network of nodes having direct access to one another.

12. The method of claim 11, the first change comprising a first edit to the document, and the second change comprising a rejection or acceptance of the first change.

13. The method of claim 10, the distributed ledger comprising a blockchain, wherein the first state is contained in a first block of the blockchain, the method further comprising sending the first change for storage in a second block of the blockchain as a difference between the first state and the second state.

14. The method of claim 13, comprising sending the first change for storage in the second block of the blockchain, by storing an entirety of the document, including the first change.

15. The method of claim 10, wherein the third status comprises a plurality of changes to the document, the method comprising displaying the plurality of changes in chronological order of change.

16. The method of claim 10, the trust credential comprising a cryptographic key, a whitelisted MAC address, or a whitelisted IP address.

17. At least one non-transitory computer-readable medium comprising a set of instructions that, in response to being executed on a computing device, cause the computing device to:
provide a trust credential for linking an electronic device via a local network to a permissioned network;

retrieve a document in an initial status; the initial status being represented in a first block of a blockchain maintained by the permissioned network;

generate a first change in the document, wherein the document is in a second status after the first change;

send the first change for storage, via the local network to the permissioned network, in a second block of the blockchain, derived from the first block;

retrieve, the document, the document being in a third status, the third status including a second change, performed subsequently to the first change, the second change being generated by a user device coupled to the local network, external to the electronic device; and retrieve from the permissioned network via the local network a third block of the blockchain, the third block comprising the first change and the second change.

18. The at least one non-transitory computer-readable medium of claim 17, the document comprising a real estate loan document or an auto loan document.

19. The at least one non-transitory computer-readable medium of claim 17, the first change comprising a first edit to the document, and the second change comprising a rejection or acceptance of the first change.

20. The at least one non-transitory computer-readable medium of claim 17, the set of instructions to send the first change for storage in the second block of the blockchain as a difference between the initial state and the second state.

\* \* \* \* \*